(12) United States Patent
Hulse et al.

(10) Patent No.: US 9,917,840 B2
(45) Date of Patent: *Mar. 13, 2018

(54) OFF-SITE USER ACCESS CONTROL

(71) Applicant: Guest Tek Interactive Entertainment Ltd., Calgary (CA)

(72) Inventors: David Andrew Hulse, Athens (GR); Mark Howard Bryars, Zurich (CH)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/260,706

(22) Filed: Sep. 9, 2016

(65) Prior Publication Data

US 2016/0381029 A1 Dec. 29, 2016

Related U.S. Application Data

(63) Continuation of application No. 14/877,606, filed on Oct. 7, 2015, now Pat. No. 9,462,000, which is a
(Continued)

(51) Int. Cl.
*H04L 29/06* (2006.01)
*H04L 12/701* (2013.01)
(Continued)

(52) U.S. Cl.
CPC .......... *H04L 63/101* (2013.01); *H04L 45/00* (2013.01); *H04L 45/02* (2013.01); *H04L 45/14* (2013.01);
(Continued)

(58) Field of Classification Search
CPC . H04L 63/00; H04L 63/04; H04L 63/042808; H04L 63/0807; H04L 63/0815;
(Continued)

(56) References Cited

U.S. PATENT DOCUMENTS 5,309,437 A 5/1994 Perlman et al.
5,420,862 A 5/1995 Perlman
(Continued)

FOREIGN PATENT DOCUMENTS

WO 2001031843 A2 5/2001
WO 2001031886 A2 5/2001

*Primary Examiner* — Jung Kim
*Assistant Examiner* — Adrian Stoica
(74) *Attorney, Agent, or Firm* — ATMAC Patent Services Ltd.; Andrew T. MacMillan

(57) ABSTRACT

Systems and methods are described for off-site user access control to communications services via a site-based communications network. Embodiments operate in context of sites, each having one or more site-based networks in communication with external networks via one or more on-site routers. User devices are provided with controlled access to those external networks via wired or wireless connections between those user devices and the site based networks. In some embodiments, on-site routers maintain route maps that indicate which user devices are authorized. Standard routing functions are used so that traffic from authorized devices is routed normally, while traffic from unauthorized devices is automatically forwarded to an off-site (e.g., cloud-based) authentication system. As devices become remotely authenticated, the off-site authentication system can remotely update route maps of the on-site routers to add those devices.

20 Claims, 7 Drawing Sheets

Related U.S. Application Data continuation of application No. 14/055,670, filed on Oct. 16, 2013, now Pat. No. 9,178,861.

(60) Provisional application No. 61/714,599, filed on Oct. 16, 2012.

(51) Int. Cl.
    *H04L 12/751*      (2013.01)
    *H04L 12/721*      (2013.01)
    *H04W 12/06*      (2009.01)

(52) U.S. Cl.
    CPC .......... *H04L 63/08* (2013.01); *H04L 63/0876* (2013.01); *H04L 63/10* (2013.01); *H04W 12/06* (2013.01)

(58) Field of Classification Search
    CPC ............ H04L 63/0823; H04L 63/0876; H04L 63/0884; H04L 63/0892; H04L 63/10; H04L 63/101; H04L 63/104; H04L 63/08; H04L 45/00; H04L 45/02; H04L 45/14; G06F 21/00; G06F 21/30; G06F 21/31; G06F 21/41; G06F 21/44; G06F 21/60; G06F 21/602; G06F 21/606; G06F 21/62; G06F 21/6218; G06F 21/6236; H04W 12/00; H04W 12/06; H04W 12/08
    See application file for complete search history.

(56) References Cited

U.S. PATENT DOCUMENTS

| | | |
|---|---|---|
| 5,678,041 A | 10/1997 | Baker et al. |
| 5,708,780 A | 1/1998 | Levergood et al. |
| 5,761,683 A | 6/1998 | Logan et al. |
| 5,781,550 A | 7/1998 | Templin et al. |
| 5,802,320 A | 9/1998 | Baehr et al. |
| 5,805,803 A | 9/1998 | Birrell et al. |
| 5,812,776 A | 9/1998 | Gifford |
| 5,848,233 A | 12/1998 | Radia et al. |
| 5,901,287 A | 5/1999 | Bull et al. |
| 5,950,195 A | 9/1999 | Stockwell et al. |
| 5,958,015 A | 9/1999 | Dascalu |
| 6,092,196 A | 7/2000 | Reiche |
| 6,098,172 A | 8/2000 | Coss et al. |
| 6,112,212 A | 8/2000 | Heitler |
| 6,170,012 B1 | 1/2001 | Coss et al. |
| 6,636,894 B1 | 10/2003 | Short et al. |
| 6,779,118 B1 | 8/2004 | Ikudome et al. |
| 7,020,082 B2 | 3/2006 | Bhagavath et al. |
| 7,194,554 B1 | 3/2007 | Short et al. |
| 7,451,193 B1 | 11/2008 | Coile et al. |
| 7,689,716 B2 | 3/2010 | Short et al. |
| 7,877,783 B1 | 1/2011 | Cline et al. |
| 8,156,246 B2 | 4/2012 | Short et al. |
| 8,244,886 B2 | 8/2012 | Short et al. |
| 8,266,266 B2 | 9/2012 | Short et al. |
| 8,266,269 B2 | 9/2012 | Short et al. |
| 8,364,806 B2 | 1/2013 | Short et al. |
| 8,370,477 B2 | 2/2013 | Short et al. |
| 8,650,495 B2 | 2/2014 | Ong |
| 9,178,861 B2 | 11/2015 | Hulse et al. |
| 2001/0044825 A1 | 11/2001 | Barritz |
| 2003/0114157 A1 | 6/2003 | Spitz et al. |
| 2005/0188212 A1 | 8/2005 | Laferriere et al. |
| 2005/0235044 A1 | 10/2005 | Tazuma |
| 2006/0235973 A1 | 10/2006 | McBride et al. |
| 2007/0180147 A1 | 8/2007 | Leigh |
| 2009/0249439 A1 | 10/2009 | Olden et al. |
| 2011/0314149 A1 | 12/2011 | Manning et al. |
| 2012/0072979 A1 | 3/2012 | Cha et al. |
| 2012/0151568 A1 | 6/2012 | Pieczul et al. |
| 2012/0198512 A1 | 8/2012 | Zhou et al. |
| 2013/0055358 A1 | 2/2013 | Short et al. |
| 2014/0068743 A1 | 3/2014 | Marcus et al. |
| 2014/0090030 A1 | 3/2014 | Ong |
| 2014/0245395 A1 | 8/2014 | Hulse et al. |
| 2014/0344890 A1 | 11/2014 | Warrick et al. |
| 2016/0028733 A1 | 1/2016 | Hulse |

OFF-SITE USER ACCESS CONTROL

CROSS-REFERENCE TO RELATED APPLICATIONS

This application is a continuation of U.S. patent application Ser. No. 14/877,606 filed on Oct. 7, 2015, which is a continuation of U.S. patent application Ser. No. 14/055,670 filed on Oct. 16, 2013, which claims the benefit of priority of U.S. Provisional Application No. 61/714,599 filed on Oct. 16, 2012. All of these applications are incorporated herein by reference.

BACKGROUND OF THE INVENTION (1) Field of the Invention

Embodiments relate generally to communications systems, and, more particularly, to off-site handling of end-user authentication for communications services.

(2) Description of the Related Art

Many venues, such as hotels, conference centers, and concert and sports venues, support wired and/or wireless communications services (e.g., Internet access) for various types of users, including guests, employees, and others. The venues often try to control user access to communications services in various ways, including by charging for access or by affecting resource provision to the user (e.g., traffic shaping, offering tiered services, etc.). For example, when a guest stays at a hotel, he may desire to access the Internet from his laptop computer. When he first connects and opens his browser (or tries to enter an Internet address in the browser), he can be presented with a "captive portal" (e.g., a purchase page) that allows him to select a usage plan, pay for services, etc. He is allowed to access some or all communications services only after accepting certain terms of use, paying for services, and/or otherwise becoming authorized.

Traditional approaches involve installing one or more expensive, highly configured gateways on-site at the venue. Access requests from user devices are received by the gateway. In some traditional implementations, the gateway serves its own captive portal page and acts as an on-site purchase engine. In other traditional implementations, the gateway redirects requests to force unauthorized users to a remotely served captive portal page. For example, the request packets are modified with a new destination address that is the address of the captive portal page. User devices can then become authorized via the captive portal page. Requests from authorized users are allowed to proceed to the Internet.

BRIEF SUMMARY OF THE INVENTION

Among other things, systems and methods are described for off-site user access control to communications services via a site-based communications network. Embodiments operate in context of sites, each having one or more site-based networks in communication with external networks (e.g., the Internet) via one or more on-site routers. User devices are provided with controlled access to those external networks via wired or wireless connections between those user devices and the site based networks. Rather than using complex on-site gateways to control user access to external communications services, embodiments use standard router functions on site to automatically forward unauthorized traffic (e.g., traffic originating from unauthorized user devices) to an off-site (e.g., cloud-based) authentication system. In some embodiments, the on-site routers maintain route maps that indicate which user devices are authorized devices (e.g., using access control lists or other matching functions, or the like). Traffic from authorized devices can be routed normally (e.g., effectively passed through to a next node of the Internet according to standard packet routing rules), while traffic from unauthorized devices is forwarded to the off-site authentication system. As the off-site authentication system authenticates devices (e.g., via an interactive captive authentication portal), the off-site authentication system can remotely update the appropriate route maps of the on-site routers at the various sites to add those devices.

According to one set of embodiments, a method is provided for off-site access control in a communications system. The method includes: receiving, by a router, a communication request from a user device for communications over the Internet, the user device being communicatively coupled with a site-based communications network; and determining, by the router, whether the user device is authorized to communicate as requested over the Internet. When the user device is not authorized to communicate as requested over the Internet according to the determining step, the method further includes: forwarding the communication request by the router to a off-site authentication system over the Internet; receiving a portal response from the off-site authentication system comprising a captive authentication portal for becoming authorized to communicate as requested over the Internet; receiving an authentication request from the user device according to the captive authentication portal; and authenticating the user device to communicate as requested over the Internet according to the authentication request.

According to another set of embodiments, a router disposed in a site-based communications network is provided. The router includes a route map and a communications subsystem. The route map indicates a number of authorized user devices, is operable to designate traffic originating from any of the authorized devices for routing to a destination address of the traffic, and is operable to designate traffic originating from any user device that is not one of the authorized devices for forwarding to an off-site authentication system. The communications subsystem is operable to: receive a communication request from a user device communicatively coupled with the site-based communications network, the communication request being for communications external to the site-based network; route the communication request to a destination address of the communication request when designated as originating from one of the authorized devices according to the route map; forward the communication request to the off-site authentication system when designated as originating from other than one of the authorized devices according to the route map; receive an indication from the off-site authentication system to authorize the user device; and update the route map to include the user device as one of the authorized user devices according to the indication.

According to yet another set of embodiments, another method is provided for off-site access control in a communications system. The method includes: receiving, by an off-site authentication system from an on-site router, a communication request originating from a user device, the user device being communicatively coupled with a site-based communications network, the communication request being for communications external to the site-based network, and the on-site router being configured so that traffic originating from any of a number of authorized user devices is automatically routed to a destination address of the traffic, and traffic originating from any user device that is not one of the authorized devices is automatically forwarded to the off-site authentication system; communicating a portal response from the off-site authentication system to the on-site router comprising a captive authentication portal for becoming authorized to communicate as requested external to the site-based network; receiving an authentication request by the off-site authentication system from the user device via the on-site router according to the captive authentication portal; determining, by the off-site authentication system, that the user device is authorized to communicate as requested external to the site-based network according to the authentication request; and communicating an instruction, by the off-site authentication system to the on-site router, directing the on-site router to update a route map to indicate that the user device is authorized to communicate at least as requested external to the site-based network according to the determining step.

According to still another set of embodiments, an off-site authentication system is provided in communication with a plurality of on-site routers, each disposed within a site-based network. The off-site authentication system includes a router controller and an authentication subsystem. The router controller is operable to: receive, from an on-site router, a communication request originating from a user device, the user device being communicatively coupled with a site-based communications network of the on-site router, the communication request being for communications external to the site-based network, and the on-site router being configured so that traffic originating from any of a number of authorized user devices is automatically routed to a destination address of the traffic, and traffic originating from any user device that is not one of the authorized devices is automatically forwarded to the off-site authentication system. The authentication subsystem is in communication with the router controller and is operable to: communicate a portal response to the on-site router comprising a captive authentication portal for becoming authorized to communicate as requested external to the site-based network; receive an authentication request from the user device via the on-site router according to the captive authentication portal; and determine that the user device is authorized to communicate as requested external to the site-based network according to the authentication request. The router controller is further operable to communicate an instruction to the on-site router directing the on-site router to update a route map to indicate that the user device is authorized to communicate at least as requested external to the site-based network according to the determination of the authentication subsystem.

According to an exemplary embodiment of the invention there is disclosed a method for off-site access control in a communications system. The method including receiving, by a router, a communication request from a user device for communications over the Internet, the user device being communicatively coupled with a site-based communications network, and the router controlling access between the site-based communications network and the Internet. The method further including determining, by the router, whether the user device is one of a plurality of authorized devices included on an access control list maintained by the router. When the user device is one of the authorized devices included on the access control list, the method further including automatically routing, by the router, outgoing network traffic originating from the user device to the Internet. When the user device is not one of the authorized devices included on the access control list, the method further including forwarding, by the router, one or more packets forming the communication request from the user device to an off-site authentication system over the Internet without modifying the one or more packets, receiving a captive authentication portal from the off-site authentication system for the user device to become authorized to communicate as requested over the Internet, communicating the captive authentication portal from the router to the user device, receiving an authentication request from the user device according to the captive authentication portal, forwarding the authentication request to the off-site authentication system, receiving an authentication response from the off-site authentication system according to the authentication request, the authentication response directing the router to add the user device to the access control list, adding the user device to the access control list by the router according to the authentication response, and after adding the user device to the access control list, automatically routing, by the router, outgoing network traffic originating from the user device to the Internet.

According to an exemplary embodiment of the invention there is disclosed a router disposed in a site-based communications network for controlling access between the site-based communication network and an external network. The router including a storage device storing therein a route map indicating a plurality of authorized user devices. The route map operable to designate traffic originating from any of the plurality of authorized devices for routing to the external network, and operable to designate traffic originating from any user device that is not one of the plurality of authorized devices for forwarding to an off-site authentication system. The router further including a communications subsystem operable to receive a communication request from a user device communicatively coupled with the site-based communications network. The communication request is for communications to the external network. The communications subsystem further operable to route outgoing network traffic originating from the user device to the external network when the communication request is designated as originating from one of the plurality of authorized devices according to the route map. When the communication request is designated as originating from other than one of the plurality of authorized devices according to the route map, the communications subsystem further operable to perform the following: Forward one or more packets forming the communication request to the off-site authentication system over the external network without modifying the one or more packets. Receive a captive authentication portal from the off-site authentication system for the user device to become authorized to communicate as requested over the external network. Communicate the captive authentication portal to the user device. Receive an authentication request from the user device according to the captive authentication portal. Forward the authentication request to the off-site authentication system. Receive an authentication response from the off-site authentication system according to the authentication request, the authentication response directing the router to add the user device to the plurality of authorized devices. Update the route map to include the user device as one of the plurality of authorized user devices according to the authentication response. Route outgoing network traffic originating from the user device to the external network after updating the route map according to the authentication response.

According to an exemplary embodiment of the invention there is disclosed an off-site authentication system in communication with a plurality of on-site routers. Each of the on-site routers disposed within a site-based network for controlling access between the site-based network and an external network. The off-site authentication system includes a router controller operable to receive, from an on-site router, a communication request originating from a user device, the user device being communicatively coupled with a site-based communications network of the on-site router. The communication request is for communications over the external net-work. The on-site router is operable so that traffic originating from any of a plurality of authorized user devices is automatically routed to the external network, and one or more packets forming traffic originating from any user device that is not one of the plurality of authorized devices is automatically forwarded to the off-site authentication system without modifying the one or more packets. The off-site authentication system further includes an authentication subsystem in communication with the router controller, and operable to communicate a captive authentication portal for the user device to become authorized to communicate as requested external to the site-based network. The authentication subsystem is further operable to receive an authentication request from the user device via the on-site router according to the captive authentication portal; and determine that the user device is authorized to communicate as requested over the external net-work according to the authentication request. The router controller is further operable to communicate an instruction to the on-site router directing the on-site router to update a route map to indicate that the user device is authorized to communicate at least as requested over the external network according to the determination of the authentication subsystem.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The present disclosure is described in conjunction with the appended figures.

Figure 1:
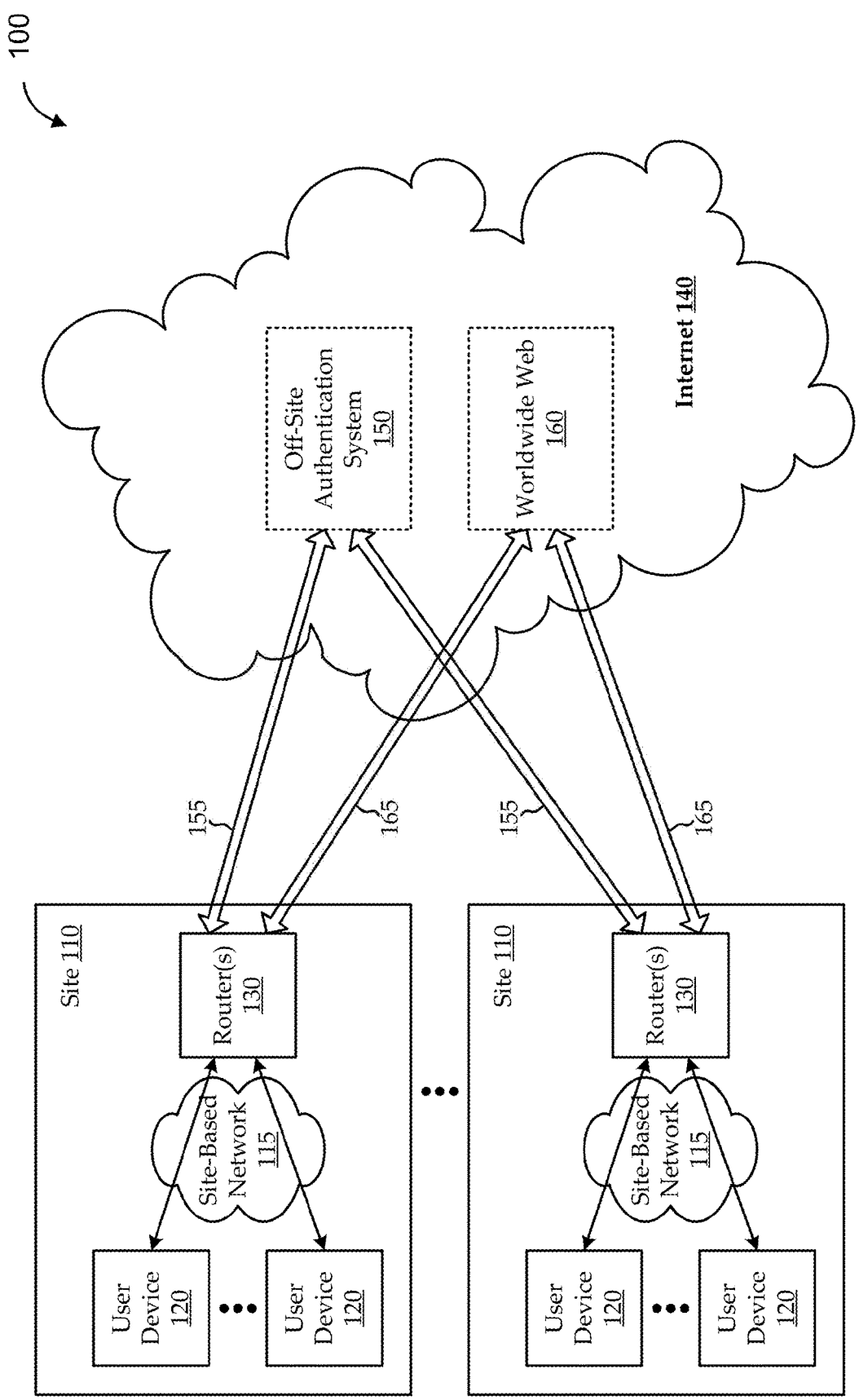
FIG. 1 shows a block diagram of an embodiment of a communications system having a number of sites that provide user devices with access to communications networks via respective site-based networks, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Many venues desire to provide wired and/or wireless communications services to on-site users. The venues often try to control user access to communications services in various ways, including by charging for access or by affecting resource provision to the user. For example, when a guest stays at a hotel, he may desire to access the Internet from his laptop computer. When he first connects and opens his browser (or tries to enter an Internet address in the browser), he can be presented with a "captive portal" (e.g., a purchase page) that allows him to select a usage plan, pay for services, agree to terms and conditions, etc. Through the captive portal page, the user can authenticate a user device, after which the device is allowed to access some or all communications services offered by the venue. Traditional approaches involve installing one or more expensive, highly configured gateways on-site at the venue for handling user access control.

Embodiments are described herein for authenticating user devices on an on-site communications network using an off-site authentication system in communication with simple on-site network routing devices ("routers"). For example, each venue has one or more standard, commercial-grade routers configured with a route map (e.g., an access control list) in communication with a cloud-based authentication system. As user devices become authorized to communicate on the site network, the route map is updated to include those devices as authorized devices. The route map is configured so that traffic received by the router from a previously authorized user device is routed normally external to the site network (e.g., to the Internet), while traffic received by the router from an unauthorized user device is forwarded (e.g., without redirection or other packet modification) to the cloud-based authentication system. This approach can provide nomadic user access control without an on-site gateway and without on-site packet modification.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

Various functionality is described with reference to "forwarding" packets. As used herein, forwarding is intended to include standard router functions involving relaying of packets from one network segment to another by nodes in a communications network. The forwarding can be with or without encapsulation (e.g., to support virtual tunneling, like VLAN, MPLS, etc.). However, forwarding is not intended to include packet modification (e.g., DNAT, SNAT, packet mangling, redirection, etc.). For example, packet redirection can modify a packet with a new destination address, so that the received packet differs from the sent packet. With forwarding, even with encapsulation, any information added to the packet by the router is removed from the packet at another node (e.g., at the next node), so that the packet itself is not modified in any way.

Turning to FIG. 1, a block diagram is shown of an embodiment of a communications system 100 having a number of sites 110 that provide user devices 120 with access to the Internet (and/or other external network) via respective site-based networks 115, according to various embodiments. Each site 110 is a location at which multiple users desire communications services. As users connect their user devices 120 to the site-based network 115, embodiments provide novel techniques for allowing the site 110 to control the users' access to communications services. For example, it may be desirable to limit a user's access to communications services via the site-based network 115 until the user has agreed to certain usage policies, provided payment information, entered a passcode or other credentials, agreed to watch advertisements, etc. Even then, it may be desirable to provide multiple tiers of service, for example, with different amounts of bandwidth, support for different types of services (e.g., voice over Internet Protocol (VoIP), television services, etc.), etc.

The sites 110 can include hotels, conference centers, medical or resident care facilities, stadiums, concert halls, WiFi hotspots, etc. The users can be guests, employees, residents, etc. using any type of user device 120, including laptops, tablets, smart phones, etc. The site-based network 115 can be implemented as any suitable type of network (e.g., a local area network (LAN), wide-area network (WAN), etc.), and can include any wired (e.g., via Ethernet ports) and/or wireless (e.g., WiFi, cellular, etc.) access points for user devices 120.

As described more fully below, embodiments provide user access control using on-site routers 130 in conjunction with an off-site (e.g., cloud-based) authentication system 150. When a user connects a user device 120 to the site-based network 115, the on-site router 130 detects the connection and issues an IP address and other common network settings to the user device 120 (e.g., via dynamic host configuration protocol (DHCP)). The user then attempts to access communications services via the site-based network 115. For example, the user attempts to access content from the World Wide Web 160 via the user device 120 in the site-based network 115.

While embodiments are described, for the sake of simplicity, with regard to controlling user access to the World Wide Web 160, similar or identical techniques can be applied to control user access to other communications networks (e.g., other locations via the Internet 140, other public and/or private networks, etc.), without departing from the scope of embodiments. Further, for the sake of simplicity, embodiments are described with reference to authorized or authenticated user devices 120, in contrast to unauthorized or on authenticated user devices 120. For the sake of this disclosure, terms, like authorized and authenticated, are used interchangeably to generally describe a user device 120 that has gone through authentication/authorization process. As will be appreciated from the description below, some authorization process provide a user device 120 with full access to communications services via the site-based network 115, while other authorization processes provide a user device 120 with access to particular services, a particular tier of services, etc. Similarly, while embodiments are described with reference to authorizing user devices 120, similar techniques can be used to concurrently authorize multiple user devices 120 or to authorize one or more users separately from a particular one or more user devices 120.

Site-based routing functions are controlled by one or more on-site routers 130. In some embodiments, the on-site routers 130 are standard, commercial-grade routers that support standard communications routing functions. Each on-site router 130 includes route map and/or access control list (ACL) functionality. As used herein, route map functionality is intended broadly to include any suitable matching functionality that can select between routes according to defined matching criteria, where the ACL generally refers to any suitable defined matching criteria. For example, the route map may effectively choose whether to forward traffic over a first route 155 (e.g., an established tunnel) or to route traffic over a second route 165 (e.g., substantially without interference to a next upstream node of the Internet 140 on the way to the traffic's destination address) according to whether the traffic originates from a user device 120 that is on an ACL.

Embodiments of the first route 155 are implemented as a virtual network tunnel (e.g., via a VLAN which may effectively create a VPN tunnel) to a server hosted off-site (e.g., "in the cloud" or at some particular address on the Internet 140). For example, the traffic is forwarded to the off-site authentication system 150 implemented as a transparent proxy server (e.g., a Squid proxy). When the traffic is forwarded over the first route 155, it is done so without packet modification (e.g., redirection, etc.). For example, in the case of a VPN tunnel, the traffic packets are encapsulated in tunnel data, which is stripped from the traffic packets at the other end of the tunnel (i.e., at the off-site authentication system 150).

As will be described more fully below, the off-site authentication system 150 serves a captive authentication portal back to the user device 120 via the on-site router 130. The user device 120 can become authenticated via the captive authentication portal, manually and/or automatically, after which the off-site authentication system 150 directs the router 130 to add the now-authenticated user device 120 to its ACL. Traffic originating from authorized user devices 120 can be automatically routed over the second route 165 (e.g., substantially without interference by the router 130) to its associated destination address on the World Wide Web 160, or the like.

Figure 2A:
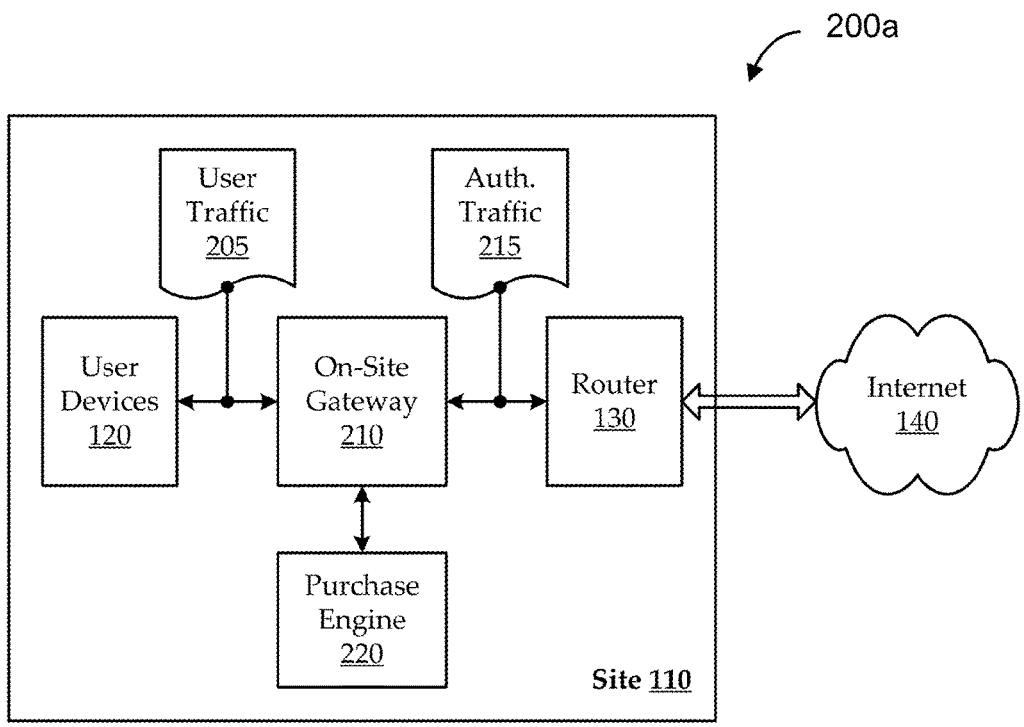
FIGS. 2A and 2B show block diagrams of two illustrative traditional implementations of user access control.
Figure 2B:
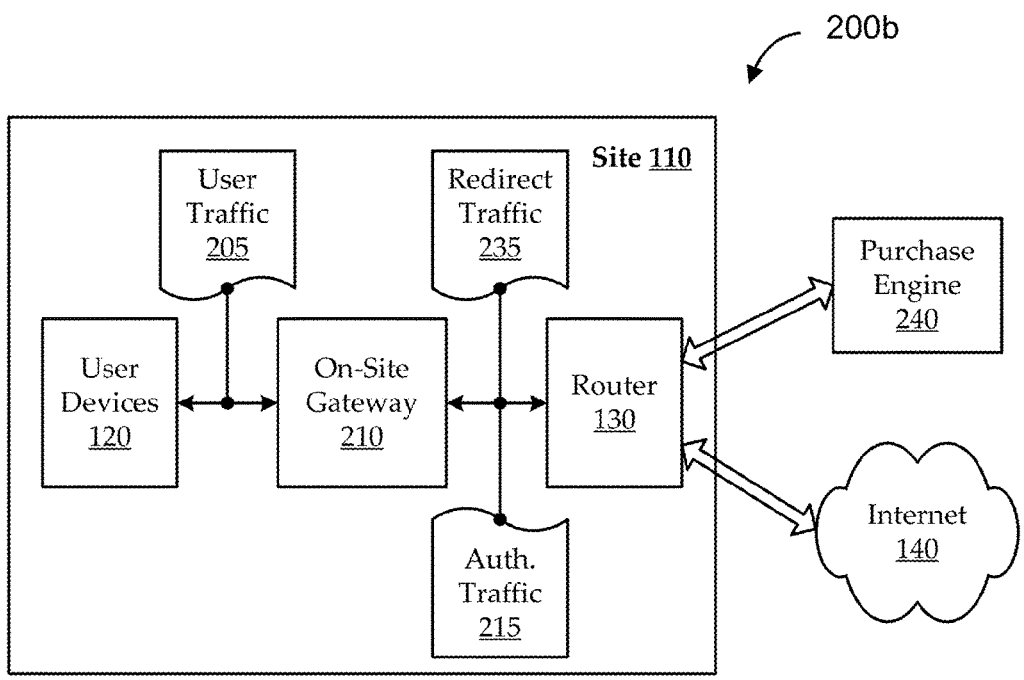

For the sake of added clarity, FIGS. 2A and 2B show block diagrams of two illustrative, traditional implementations of user access control. These illustrations are not intended to provide a full and accurate depiction of all other prior implementations of similar functionality. Rather, the illustrations are intended only to highlight certain inventive departures between some typical traditional implementations and embodiments described herein.

Turning first to FIG. 2A, a block diagram of a communication system 200a is shown to illustrate a category of traditional user access control implementations. Users desire access to communications services (e.g., over the Internet 140) via their user devices 120 and a site-based network. When a user device 120 attempts to send a communication to the Internet 140, the user traffic 205 is captured (e.g. intercepted, etc.) by an on-site authentication gateway 210. The on-site authentication gateway 210 determines whether the user traffic 205 originates from an authenticated user device 120. If so, the user traffic 205 is authenticated traffic 215 and is allowed to be routed (e.g., by a router 130) to the Internet 140 according to its destination address. If not, the on-site authentication gateway 210 uses its on-site purchase engine 220 to serve up a captive authentication portal to the user device 120, through which the user device 120 can become authenticated.

Turning to FIG. 2B, a block diagram of another communication system 200b is shown to illustrate another category of traditional user access control implementations. As in FIG. 2A, when a user device 120 attempts to send a communication to the Internet 140, the user traffic 205 is captured by an on-site authentication gateway 210. The on-site authentication gateway 210 determines whether the user traffic 205 originates from an authenticated user device 120. If so, the user traffic 205 is authenticated traffic 215 and is allowed to be routed (e.g., by a router 130) to the Internet 140 according to its destination address. If not, the on-site authentication gateway 210 modifies the traffic packets (e.g., using redirection), causing the user traffic 205 to be redirected traffic 235 that is sent to an off-site purchase engine 240. The off-site purchase engine 240 serves up a captive authentication portal to the user device 120, through which the user device 120 can become authenticated.

Both of the illustrative traditional implementations include an on-site authentication Gateway 210. These devices are typically expensive, prone to failure, and configured on-site by skilled technicians in accordance with the site network devices and architecture. Embodiments, such as the one described with reference to FIG. 1, use off-site authentication and standard router functionality. For example, embodiments use standard route map functionality to make a route or forward decision at each on-site router 130. Typically, these standard routers 130 are relatively inexpensive, easy to acquire, easy to install in a site-based network 115, and remotely configurable. For the sake of illustration, a user device 120 can be added to a router's 130 ACL by the off-site authentication system 150 (i.e., without any additional on-site gateway hardware). Further, the types of routers 130 used in embodiments can typically be purchased, replaced, upgraded, serviced, etc. by lower skilled technicians and/or at lower cost. Even further, using some embodiments described herein, a site 110 can quickly and easily change its capacity to service more or fewer concurrent user devices 120 by adding routers 130 and/or by spinning up additional server capacity for the off-site authentication system 150 (e.g., particularly where the off-site authentication system 150 is implemented using cloud-based servers, or the like). For example, if the site 110 is a stadium or concert venue, it may experience large spikes in demand during events. To satisfy these spikes in demand using traditional implementations, the site 110 would typically have enough on-site gateways to accommodate the relatively short periods of very high demand, and many (if not most) of those on-site gateways would sit idle during the relatively long periods of low demand.

Figure 3:
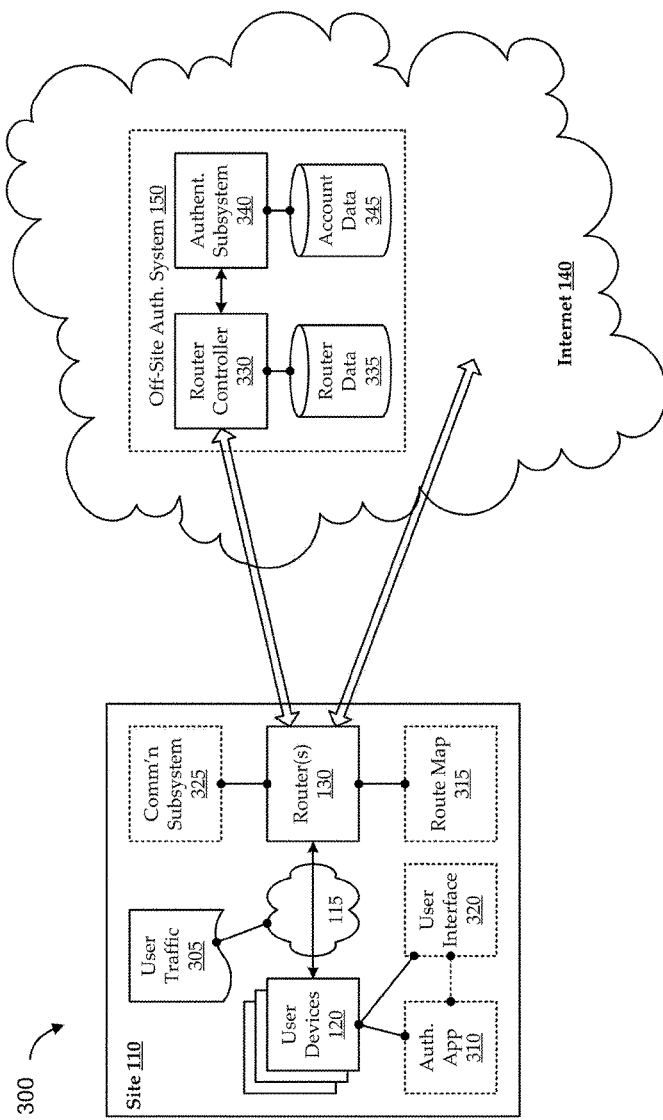
FIG. 3 shows a block diagram of another communication system for implementing off-site user access control, according to various embodiments.

FIG. 3 shows a block diagram of another communication system 300 for implementing off-site user access control, according to various embodiments. For the sake of clarity, only a single site 110 is shown. In number of user devices 120 desire to communicate external to the site-based network (e.g., over the Internet 140) via the site-based network 115. Control of user device access to communications services is implemented by one or more on-site routers 130 working in conjunction with an off-site authentication system 150. Each on-site router 130 (or groups of on-site routers 130) maintains a route map 315. In the illustrative embodiment, the route map 315 is remotely configurable, for example, to add user devices 120 to and remove user devices 120 from an associated ACL.

When a user device 120 sends user traffic 305 to the router 130, the router 130 consults its route map 315 to determine whether the user device 120 from which the traffic 305 originated is indicated as an authorized user device 120. For example, if the originating user device 120 is on the ACL, the route map 315 routes the packets (e.g., in an unmodified manner) to a next upstream node of the communications network on the way to each packet's destination address. If the originating user device 120 is not on the ACL, the route map 315 automatically forwards the packets (e.g., over a virtual tunnel) to the off-site authentication system 150.

While the off-site authentication system 150 is illustrated as being located in the Internet, the off-site authentication system 150 can be in any suitable location that is external to the site-based network 115. In some implementations, the off-site authentication system 150 is implemented on a physical server that has an associated IP address through which it can communication authenticated-related information. In other implementations, the off-site authentication system 150 is implemented across one or more servers that are in one or more locations, and the servers are configured as one more virtual servers accessible at one or more IP addresses. For example, the off-site authentication system 150 functionality is implemented on leased, cloud-based, virtual server space. In still other implementations, one or more physical or virtual servers are disposed in public or private networks other than the Internet.

Embodiments of the off-site authentication system 150 include a router controller 330 and an authentication subsystem 340. The router controller 330 is operable to remotely control and/or monitor functions of the on-site routers 130 at one or more sites 110. For example, the router controller 330 maintains router data 335 including route maps of many routers at many sites. The router controller can be used to validate and/or audit route maps; repair or synchronize route maps in the event of the failure; monitor statistical data and/or other types of information across multiple routers, sites, regions, etc.; remove user devices from authorization when their authorization has expired or for other reasons (e.g., for violations of terms and conditions, etc.); and/or perform any other useful router control functions.

The authentication subsystem 340 is operable to remotely serve the captive authentication portal. In some implementations, the authentication subsystem 340 maintains account data 345 corresponding to one or more sites 110, users, user devices 120, etc. Embodiments can use the account data 345 to adapt the type of captive authentication portal served by the authentication subsystem 340 for different contexts. For example, a user that is part of a particular loyalty program may be served a custom captive authentication portal with particular options that are not available to certain other users. In some implementations, the authentication subsystem 340 includes a payment engine. In other implementations, authentication is achieved in a manner other than payment (e.g., by agreeing to terms and conditions, advertisements, etc.).

For the sake of illustration, the router 130 is disposed in a site-based communications network 115. The router 130 includes a route map 315 that indicates a number of authorized user devices 120, is operable to designate user traffic 305 originating from any of the authorized devices for routing to a destination address of the traffic (e.g., on the Internet 140), and is operable to designate traffic originating from any user device that is not one of the authorized devices for forwarding to the off-site authentication system 150.

Embodiments of the router also include a communications subsystem 325 for handling sending- and receiving-related functions of the router 130. In some embodiments, the communications subsystem 325 is operable to receive a communication request from a user device 120 communicatively coupled with the site-based network 115, the communication request being for communications external to the site-based network 115. The communications subsystem 325 either routes the communication request to a destination address of the communication request when designated as originating from one of the authorized user devices 120 according to the route map; or it forwards the communication request to the off-site authentication system 150 when designated as originating from an unauthorized user device 120 according to the route map 315.

The off-site authentication system is in communication with the on-site router 130. Embodiments of the router controller 330 receive the communication request originating from the user device 120 via the router 130. Embodiments of the authentication subsystem 340 communicate a response to the on-site router 130 having a captive authentication portal for becoming authorized to communicate as requested external to the site-based network 115. The communications subsystem 325 of the router 130 can pass the captive authentication portal to the user device 120. Subsequently, the communications subsystem 325 of the router 130 can receive an authentication request from the user device 120 in response to the captive authentication portal, and can forward the authentication request to the off-site authentication system 150 (i.e., the user device is still not authenticated, so the request is automatically forwarded per the route map 315).

The authentication request is received by the authentication subsystem 340 of the off-site authentication system 150. Though the illustrated embodiment shows all traffic passing through the router controller 330 to the authentication subsystem 340, other architectures are possible without departing from the scope of embodiments, including providing communications directly between the router 130 and the authentication subsystem 340. The authentication subsystem 340 can determine whether the user device is authorized to communicate as requested external to the site-based network according to the authentication request. When determined to authorize the user device 120, the router controller 330 can communicate an instruction to the on-site router 130 directing it to update its route map 315 to indicate that the user device 120 is authorized to communicate at least as requested external to the site-based network. Accordingly, the router 130 can add the user device 120 to its ACL, or otherwise update its route map in accordance with the instruction from the router controller 330.

The authentication exchange can be implemented in a number of ways. According to some implementations, the authentication subsystem 340 communicates the response to the on-site router 130 as content page data of a captive portal webpage that includes an authentication prompt and is configured for display via a user interface 320 (e.g., browser interface) of the user device 120. The authentication request can be received from the user device 120 in response to the authentication prompt via the user interface 320. According to other implementations, the authentication subsystem 340 communicates the response to the on-site router 130 as a request for a set of stored credentials from a local application 310 running on the user device 120. The local application 310 may or may not be specifically designed as an authentication application. Further, the local application 310 may or may not solicit user input (e.g., via the user interface 320). For example, the local application 310 may be a browser or other application that displays the captive authentication portal to the user and waits for entry of authentication data. Alternatively, the local application 310 may be a dedicated application (e.g., a thin or thick client application) that provides credentials or other authentication information without user input (e.g., as a background process, etc.). Even in the case of a local application 310 that does not solicit user input at the time of the transaction, some local applications 310 may be preconfigured with user preferences, so it can autonomously provide the user's desired authentication request in the manner desired by the user.

Regardless of the manner in which the authentication exchange is implemented, the authentication request can include any suitable transaction or agreement on the part of the user in exchange for the desired communications services. For example, the authentication request can include a credential corresponding to hardware or software of the user device (e.g., an internet protocol (IP) address, Media Access Control (MAC) address, browser type, etc.), a credential corresponding to a user of the user device (e.g., a room number, a user name, a loyalty program identifier, etc.), information corresponding to a payment transaction for communications services over the site-based network (e.g., a credit card number, a payment confirmation code, etc.), an indication of agreement to view promotional content (e.g., an agreement to watch advertisements), an indication of agreement to a usage policy for communications services over the site-based network (e.g., an agreement to certain terms and conditions, privacy policies, end user license agreements, etc.), etc. In some implementations, additional information is provided and/or received from third parties. For example, payment for communications services can be handled through a third-party payment site (e.g., served via the off-site authentication system 150), which can return payment confirmation to the user, directly to the authentication subsystem 340, or in any other suitable manner.

Some embodiments include additional functionality, for example, for improving user experience. Suppose a user submits a request for content from a destination host (e.g., a uniform resource locator (URL), like "www.example.com") via an unauthenticated user device. As described above, the packets are forwarded so that they arrive at the off-site authentication system 150 with their original destination URL intact. Accordingly, in some implementations, the off-site authentication system 150 appears to return the captive authentication portal from "www.example.com." For example, from the user's perspective, the user enters "www.example.com" into the browser interface. In response, a captive authentication portal webpage is displayed, but it appears as though the captive portal page is coming from "www.example.com" (e.g., that is the address of the displayed page indicated by the browser interface).

While that is acceptable in some implementations (e.g., where the authentication is performed without user interaction, or not through a browser interface), other implementations use techniques to associate a returned captive authentication portal webpage with an appropriate captive portal URL. This can avoid confusing users as discussed above, and can also allow for proper association of cookies and/or any other information that may be used by the browser interface. For example, if the user enters "www.example.com," any cookies will be cached by the browser in association with that URL, even if the user is actually interacting with a captive authentication portal webpage. Similarly, if any cookies or other credentials are captured during the authentication process via the captive authentication portal webpage, those cookies or other credentials could be sent to the "www.example.com" host. Accordingly, in certain implementations, the off-site authentication system 150 sends a redirect response to the captive portal page URL. To the user's browser and the user, it appears as if Google itself sent the redirect. The user's browser obeys the redirect and the browser URL changes to a captive authentication portal webpage URL. This allows the URL to correctly display in the browser interface as the address of the captive portal page, and any cookies or the like can now be associated correctly.

In system embodiments, including those described above with reference to FIGS. 1 and 3, the various subsystems and components can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

Figure 4:
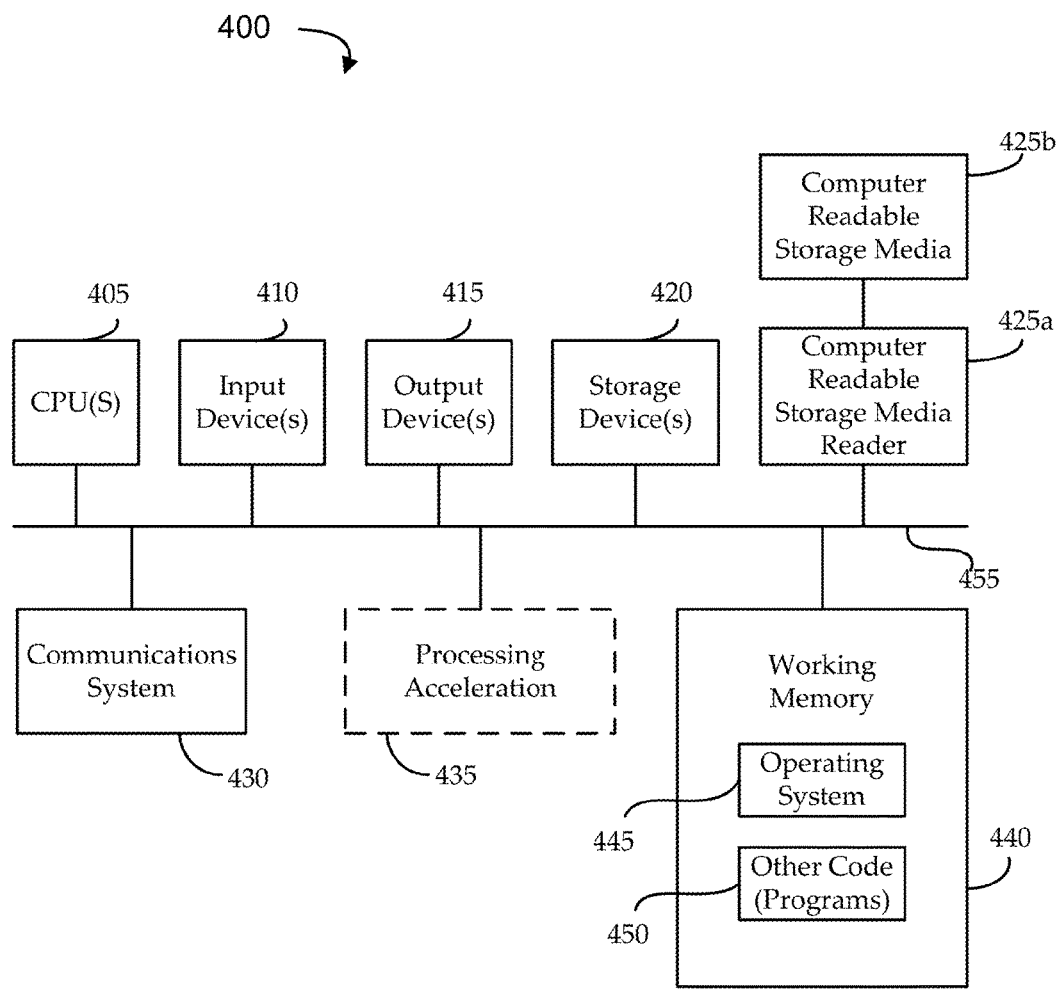
FIG. 4 shows a block diagram of an illustrative computational system for implementing subsystems or components of various embodiments.

For example, FIG. 4 shows a block diagram of an illustrative computational system 400 for implementing subsystems or components of various embodiments. The computational system 400 can include or perform functionality of components of subsystems or various embodiments, such as those described above in FIGS. 1 and 3, as or embodied in single or distributed computer systems, or in any other useful way. The computational system 400 is shown including hardware elements that can be electrically coupled via a bus 455.

The hardware elements can include one or more central processing units (CPUs) 405, one or more input devices 410 (e.g., a mouse, a keyboard, etc.), and one or more output devices 415 (e.g., a display device, a printer, etc.). The computational system 400 can also include one or more storage devices 420. By way of example, storage device(s) 420 can be disk drives, optical storage devices, solid-state storage device such as a random access memory (RAM) and/or a read-only memory (ROM), which can be programmable, flash-updateable and/or the like. In some embodiments, the storage devices 420 include or are in communication with (or are used to store) the route maps 315, router data 335, account data 345, etc., as described above.

The computational system 400 can additionally include a computer-readable storage media reader 425*a*, a communications system 430 (e.g., a modem, a network card (wireless or wired), an infra-red communication device, etc.), and working memory 440, which can include RAM and ROM devices as described above. In some embodiments, the computational system 400 can also include a processing acceleration unit 435, which can include a DSP, a special-purpose processor and/or the like.

The computer-readable storage media reader 425*a* can further be connected to a computer-readable storage medium 425*b*, together (and, optionally, in combination with storage device(s) 420) comprehensively representing remote, local, fixed, and/or removable storage devices plus storage media for temporarily and/or more permanently containing computer-readable information. The communications system 430 can permit data to be exchanged with a network (e.g., site-based network 115, the Internet 140, etc.) and/or any other computer described above with respect to the computational system 400. For example, as described with reference to FIGS. 1 and 3, access control information, content traffic, and/or other information can be communicated among various portions of the communications infrastructure via the communications system 430.

The computational system 400 can also include software elements, shown as being currently located within a working memory 440, including an operating system 445 and/or other code 450, such as an application program (which can be a client application, web browser, mid-tier application, relational database management system (RDBMS), etc.). In some embodiments, one or more functions of the router 130, off-site authentications system 150, etc. are implemented as application code 450 in working memory 440. Alternate embodiments of a computational system 400 can have numerous variations from that described above. For example, customized hardware might also be used and/or particular elements might be implemented in hardware, software (including portable software, such as applets), or both. Further, connection to other computing devices such as network input/output devices can be employed.

Figure 5:
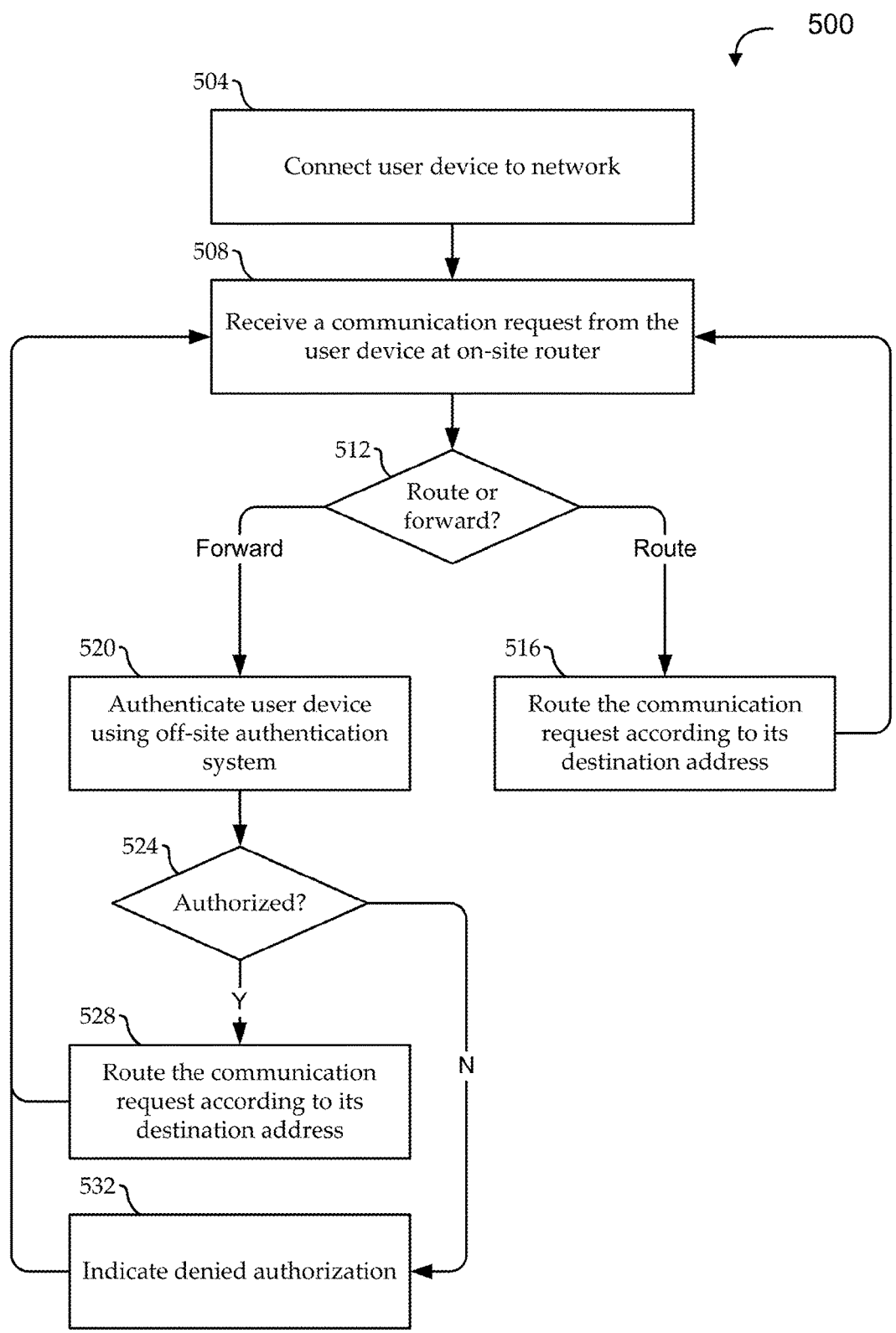
FIG. 5 shows a flow diagram of an illustrative method for off-site user access control, according to various embodiments.

Turning to FIG. 5, a flow diagram is shown of an illustrative method 500 for off-site user access control, according to various embodiments. Embodiments of the method 500 begin at stage 505 when a user device connects to the site-based network. A user can connect a laptop, smart phone, or other suitable user device to a wired network port, a wireless network, or other suitable network access location. For example, a hotel may have Ethernet ports in the guest rooms, lobby, business center, executive floor lounges, conference rooms, front offices, and back offices; and multiple guest wireless networks covering different areas of the hotel. When the user connects a device to the site-based network in any of these or other ways, the network issues addressing information to the device. For example, in a typical IP network, a router issues an IP address and various network settings to the device via DCHP.

At stage 508, the user device attempts to communicate external to the network. In some implementations, upon detecting the connection, a communication is attempted either by pushing the communication from the device (e.g., from an application on the device) or by pulling the communication from the device. In other implementations, the communication is separate from the connection. For example, the user opens a browser and enters a URL, the user executes an application that automatically looks for a connection to the Internet, etc. As described above, each site has one or more routers logically disposed between the on-site network and any external network (e.g., the Internet). Accordingly, all communications external to the network pass through one of the on-site routers.

At stage 512, the router determines whether to route or forward the received communication. Using standard routing functionality, the router consults a route map to determine whether the communication originated from a device already recognized as an authorized device. If so (e.g., if the IP address of the originating device is listed in the router's ACL), the router makes a route decision. If not (e.g., if the IP address of the originating device is not listed in the router's ACL), the router makes a forward decision.

When the router determines at stage 512 to route the communication, the method 500 proceeds to stage 516 and routes the communication according to its destination address. For example, if the communication is to a content host located at a destination IP address on the Internet, the router can pass the communication to a next node of the Internet on the way to the destination IP address. When the router determines at stage 512 to forward the communication, the method 500 proceeds to stage 520 and forwards the communication to an off-site authentication system for authentication of the user device. For example, the communication is forwarded to a remote (e.g., cloud-based) server via a logical secure tunnel. The remote server determines whether and how to authorize the device, and authorizes the device at least by updating the on-site router to recognize the user device as an authorized device, as described more fully below.

If the remote server determines to authorize the device (illustrated as decision stage 524), some embodiments route the communication according to its destination address at stage 528. In some implementations, this includes notifying the user device (e.g., and/or the user the user interface) that the authentication was successful in the communication request is being fulfilled. In other implementations, this includes additional information and/or communications according to the authentication process. For example, advertisements may be communicated and/or displayed to the user if the user opted to view those promotional materials as part of authentication. In still other implementations, the process is substantially transparent to the user and the user's request simply appears from the user's perspective to be fulfilled. If the remote server determines not to authorize the device, embodiments notify the user and/or otherwise indicate that the user device has been denied authorization at stage 532.

As illustrated, embodiments of the method 500 can return to stage 508 when a next communication request is received from the user device at the on-site router. Upon returning stage 508, the user device is either still authorized (i.e., a route decision was made for the previous communication request and nothing has changed to de-authenticate the user device), now authorized (i.e., a forward decision was made for the previous communication request, and the user device was subsequently authenticated), or still not authorized (i.e., a forward decision was made for the previous communication request, and the user device was subsequently not authenticated). According to some embodiments, the same route or forward determination is made once again by the on-site router at stage 512. If the user device is still not authorized, the on-site router will again make a forward decision in an attempt to authorize the user device using the off-site authentication system. If the user device is still authorized or is newly authorized, the on-site router will make a route decision and will route the communication request according to its destination address.

According to some embodiments, if the user device continues to be denied authorization, the method 500 will cycle through stages 508, 512, 520, 524, and 532 until the user device stops making communication requests were the user device is ultimately authorized. According to other embodiments, techniques are used to limit the number of times a user device may attempt authentication (e.g., within some period of time). For example, if a user device fails to be authenticated three times in a row, the user device may be prevented from attempting authentication again for a twelve hour period. To preserve simplicity at the on-site router, this functionality can be implemented at the off-site authentication system. For example, a forward determination is made at stage 512. Rather than attempting to authenticate the user device at stage 520, the off-site authentication system detects that too many failed authentication attempts have occurred, and automatically returns an indication to that effect to the user device.

Figure 6:
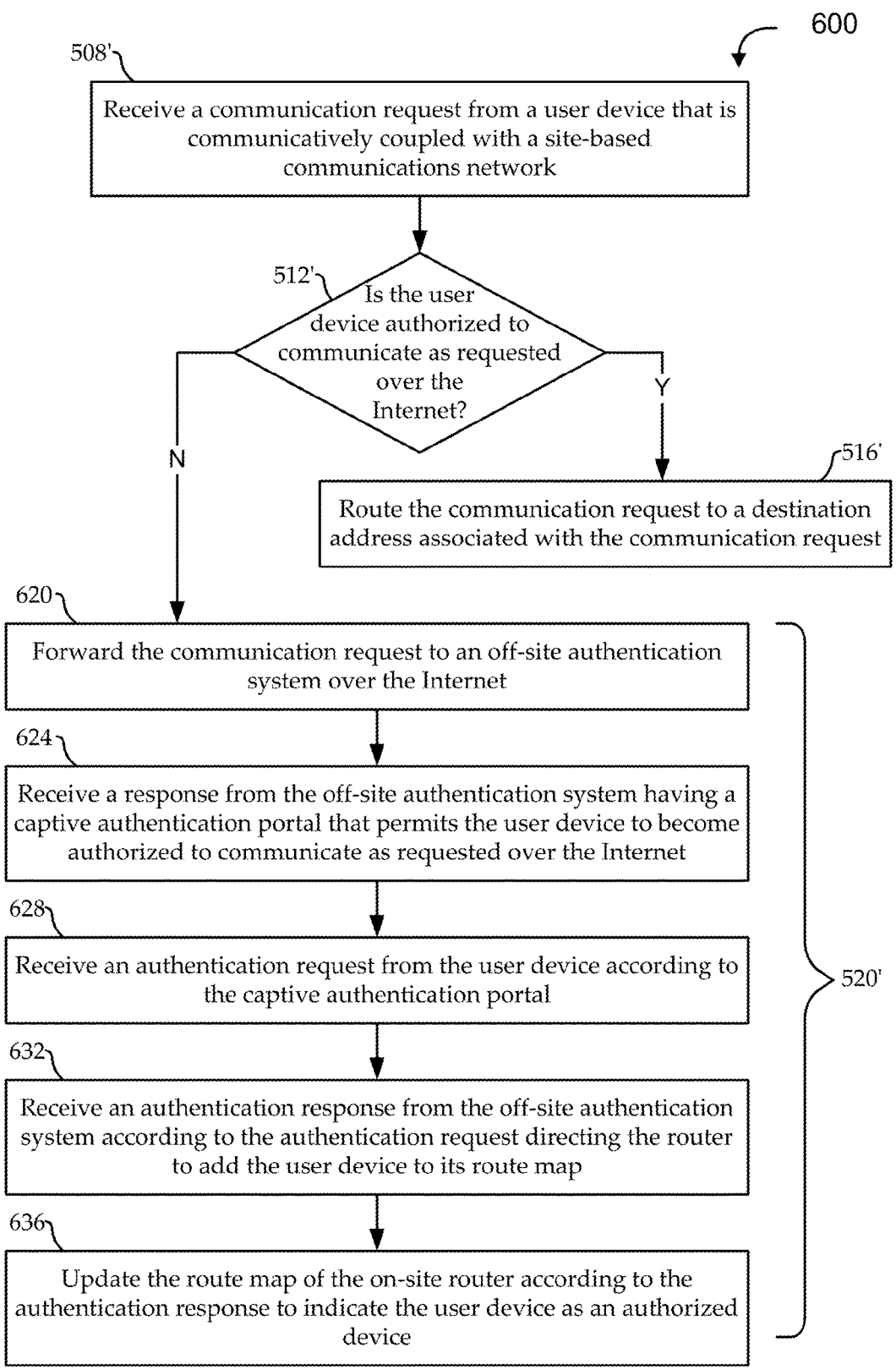
FIG. 6 shows a flow diagram of an illustrative authentication method for off-site user access control from the perspective of an on-site router, according to various embodiments.

FIG. 6 shows a flow diagram of an illustrative authentication method 600 for off-site user access control from the perspective of an on-site router, according to various embodiments. Embodiments of the method 600 operate in context of a site-based network having at least one on-site router in communication with an off-site authentication system. A user device is connected to the site-based network and is attempting to communicate external to the site-based network (e.g., to a location on the Internet). For the sake of context and clarity, the method 600 includes reference numerals to refer back to embodiments of stages 508-520 described above with reference to FIG. 5. For example, stage 508' is intended to refer to similar functionality described above with reference to stage 508 of FIG. 5, though the scope and/or function of each respective stage may differ according to its method context.

At stage 508', a communication request is received at the on-site router from a user device for communication external to the site-based network. At stage 512', a determination is made as to whether the user device is authorized to communicate as requested over the Internet. In some implementations, this involves the on-site router making a route or forward determination according to whether the user device is listed in its route map as an authorized user device. The determination at stage 512' is intended only to be a simple routing determination, and is not intended to include any kind of interactive authentication process. If it is determined at stage 512' that the user device is already authorized to communicate as requested over the Internet (e.g., the user device is included in the on-site router's ACL), the communication can be routed to the destination address associated with the communication request at stage 516'.

If it is determined at stage 512' that the user device is not authorized to communicate as requested over the Internet, the on-site router proceeds to forward the communication to the off-site authentication system for authentication of the user device at stage 520'. As illustrated, embodiments of stage 520' can include stages 620-636. At stage 620, the communication request received at the on-site router is forwarded by the router (e.g., the logical tunnel) to the off-site authentication system over an external network, like the Internet.

At stage 624, a response is received from the off-site authentication system that includes a captive authentication portal that permits the user device to become authorized to communicate as requested over the Internet. The captive authentication portal can be received in a number of ways and can include a number of different types of information and/or options. In some implementations, the captive authentication portal is communicated in such a way as to display an authentication prompt via a user interface of the user device. For example, the captive authentication portal includes content page data of a captive portal webpage that includes the authentication prompt and is configured for display via a browser interface or other application interface of the user device.

For the sake of illustration, an airport lounge patron connects her tablet computer to the lounge's Wi-Fi network, and enters a URL into a browser interface. Instead of receiving the webpage corresponding to the entered URL, the patron sees a purchase page for the purchase of communications services. The purchase page includes a number of options and other information. For example, the patron can purchase unlimited, high-speed Internet access for one hour at one price, a ten-minute preview of limited communications services in exchange for watching an advertisement, etc. The purchase page can also prompt the patron to accept certain terms and conditions (e.g., terms of use, privacy policy, etc.), provide the patron with various payment options (e.g., credit card, link to third-party payment site, loyalty program rewards or debits, etc.), and provide and/or solicit any other useful information.

In some other implementations, applications other than browser interfaces are used for authentication. For example, the user runs a local application (e.g., a dedicated local thin client application) that is configured to interact with the captive authentication portal served by the off-site authentication system. In some such implementations, the local application provides the user interface by which the user can interact with the off-site authentication system to authenticate the user device. In other such implementations, the local application interacts with the off-site authentication system to authenticate the user device with little or no user interaction. For example, the captive authentication portal is communicated in such a way that it effectively requests credentials and/or other information stored by the local application, and the local application provides those credentials to the captive authentication portal for authentication of the user device.

Regardless of the manner in which the captive authentication portal is communicated to the user device, embodiments receive an authentication request from the user device according to the captive authentication portal at stage 628. In implementations where the captive authentication portal includes interactive elements designed to prompt the user for authentication input, the authentication request can include that input and any other useful information for authentication of the user device. In implementations where the captive authentication portal is non-interactive, the authentication request can include any information provided by the user device in response to captive authentication portal instructions. For example, the authentication request can include credentials corresponding to hardware or software of the user device (e.g., an IP or MAC address, browser type, etc.), a credential corresponding to a user of the user device (e.g., a room number, a user name, a loyalty program identifier, etc.), information corresponding to a payment transaction for communications services over the site-based network (e.g., a credit card number, a payment confirmation code, etc.), an indication of agreement to view promotional content (e.g., an agreement to watch advertisements), an indication of agreement to a usage policy for communications services over the site-based network (e.g., an agreement to certain terms and conditions, privacy policies, end user license agreements, etc.), etc.

For the sake of simplicity, stages 632 and 636 assume that the authentication process is successful (e.g., the off-site authentication system determines, according to information sent with the authentication request, that it is appropriate to authorize the user device for communication as requested external to the site-based network). At stage 632, an authentication response is received from the off-site authentication system directing the on-site router to add the user device to its route map. For example, the off-site authentication system includes a router controller operable to remotely configure the on-site router's route map at least by adding or removing entries from its ACL. The authentication response can include instructions (e.g., code and/or other communications) to remotely direct the on-site router to update its ACL to include the user device as an authorized device. At stage 636, the on-site router updates its route map according to the authentication response from the off-site authentication system. For example, the on-site router updates its ACL to add the user device as an authorized device. As described above, once the user device is indicated as an authorized device, the route path of the on-site router is configured to effectively pass through traffic from those authorized devices without forwarding the traffic to the off-site authentication system.

Figure 7:
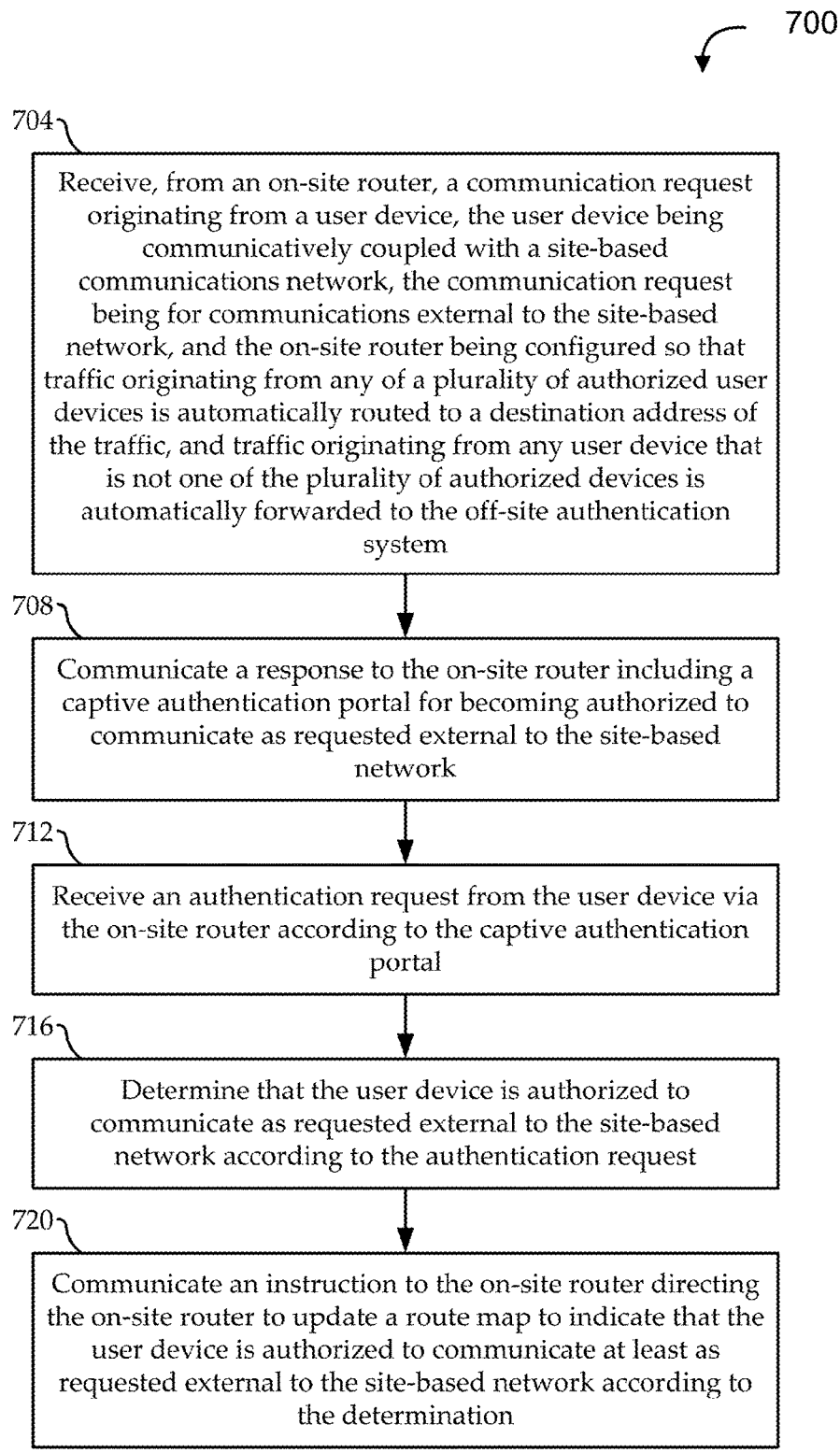
FIG. 7 shows a flow diagram of an illustrative authentication method for off-site user access control from the perspective of an off-site authentication system, according to various embodiments.

FIG. 7 shows a flow diagram of an illustrative authentication method 700 for off-site user access control from the perspective of an off-site authentication system, according to various embodiments. Embodiments of the method 700 operate in context of a site-based network having at least one on-site router in communication with the off-site authentication system. Embodiments begin at stage 704 when a communication request is received at the off-site authentication system from a user device. The user device is connected via the site-based network and is requesting communications and external to the site-based network for which it needs proper authorization. The on-site router is configured so that traffic originating from any of a number of authorized user devices is automatically routed to a destination address of the traffic (e.g., normally over the Internet), while traffic originating from many user device that is not one of the authorized devices is automatically forwarded to the off-site authentication system. Accordingly, it can be assumed that the communication request received at stage 704 by the off-site authentication system originated from an unauthorized user device (i.e., as the communication request would have been routed to its destination on the Internet if it had originated from an authorized device).

At stage 708, the off-site authentication system communicates in a response to the on-site router that includes a captive authentication portal for becoming authorized to communicate as requested external to the site-based network. As described above, the captive authentication portal can provide an interactive authentication environment for a user (e.g., a captive portal page for display via a browser interface), a non-interactive authentication environment for a client application, or any other suitable authentication portal. At stage 712, an authentication request is received from the user device via the on-site router according to (e.g., in response to) the captive authentication portal. The authentication request can include any information useful for authenticating the user device, including credential information, payment information, etc. In some implementations, some or all of the authentication request information is received from the user device via a third-party. For example, the authentication portal may allow the user device to interact with a third-party payment site, and payment confirmation information may be provided to the authentication portal from the user device or from the third-party payment site.

At stage 716, the off-site authentication system determines that the user device is authorized to communicate as requested external to the site-based network according to the authentication request. In some embodiments, this determination includes fully authorizing the user device to communicate external to the site-based network. For example, authenticating the user device may authorize the user device to communicate with any website, stream any media, use any Internet telephony services, etc. that are otherwise within the scope of usage policies and/or other agreements. In other embodiments, the determination is limited to a particular scope (e.g., type or level) of communications services, and any request for communications outside that particular scope may result in the user device having to become further authorized or re-authorized.

At stage 720, the off-site authentication system communicates an instruction to the on-site router erecting the on-site router to update its route map to indicate that the user device is authorized to communicate at least as requested external to the site-based network, according to the determination at stage 716. As described above, the instructions may cause the on-site router to add the user device to its ACL or to otherwise indicate in its route map to no longer forward traffic from that user device to the off-site authentication system. In some embodiments, the on-site router's route map is at least partially controlled remotely by a router controller of the off-site authentication system, as described above with reference to FIG. 3.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions, including, for example, hardware and/or software. The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a web site, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for off-site access control in a communications system, the method comprising:
   receiving, by a router, a communication request from a user device for communications over an external network; wherein the user device is communicatively coupled with a site-based communications network, and the router controls access between the site-based communications network and the external network;
   determining, by the router, whether the user device is one of a plurality of authorized devices included on an access control list;
   when the user device is one of the authorized devices included on the access control list, automatically routing, by the router, outgoing network traffic originating from the user device to the external network; and
   when the user device is not one of the authorized devices included on the access control list:
      forwarding one or more packets forming the communication request from the user device to an off-site authentication system over the external network without modifying the one or more packets;
      after forwarding the one or more packets forming the communication request to the off-site authentication system, receiving an authentication response from the off-site authentication system, the authentication response directing the router to add the user device to the access control list;
      adding the user device to the access control list in response to the authentication response; and
      after adding the user device to the access control list, automatically routing, by the router, outgoing network traffic originating from the user device to the external network.

2. The method of claim 1, wherein forwarding the one or more packets forming the communication request from the user device to the off-site authentication system over the external network without modifying the one or more packets comprises acting as a transparent proxy between the user device and the off-site authentication system.

3. The method of claim 1, wherein forwarding the one or more packets forming the communication request from the user device to the off-site authentication system over the external network without modifying the one or more packets comprises encapsulating the one or more packets of the communication request within data of a logical tunnel between the router and the off-site authentication system.

4. The method of claim 1, further comprising continuing to forward packets from the user device to the off-site authentication system during a period of time between forwarding the one or more packets forming the communication request and receiving the authentication response.

5. The method of claim 1, further comprising removing the user device from the access control list after an authorization has expired for the user device.

6. The method of claim 1, wherein, after forwarding the one or more packets forming the communication request to the off-site authentication system but before receiving the authentication response from the off-site authentication system, the method further comprises:

receiving a captive authentication portal from the off-site authentication system for the user device to become authorized to communicate as requested over the external network;

communicating the captive authentication portal from the router to the user device;

receiving an authentication request from the user device according to the captive authentication portal;

forwarding the authentication request to the off-site authentication system.

7. The method of claim 6, wherein:

the captive authentication portal comprises an authentication prompt; and receiving the authentication request from the user device according to the captive authentication portal comprises:

communicating the captive authentication portal from the router to the user device in such a way as to display the authentication prompt via a user interface of the user device; and receiving the authentication request from the user device in response to the authentication prompt via the user interface.

8. The method of claim 7, wherein:

the user interface is a browser interface; and the captive authentication portal comprises content page data of a captive portal webpage that includes the authentication prompt and is configured for display via the browser interface of the user device.

9. The method of claim 7, wherein the authentication request comprises user credentials submitted by a user via the user interface.

10. The method of claim 6, wherein:

the user device is running a local authentication application having a set of stored credentials;

the captive authentication portal comprises an authentication prompt configured to request the set of stored credentials from the local authentication application; and receiving the authentication request from the user device according to the captive authentication portal comprises receiving the set of stored credentials from the local authentication application authentication in response to the authentication prompt.

11. A router disposed in a site-based communications network for controlling access between the site-based communication network and an external network, the router comprising:

a storage device storing therein a route map indicating a plurality of authorized user devices, the route map operable to designate traffic originating from any of the plurality of authorized devices for routing to the external network, and operable to designate traffic originating from any user device that is not one of the plurality of authorized devices for forwarding to an off-site authentication system; and a communications subsystem operable to:

receive a communication request from a user device communicatively coupled with the site-based communications network, the communication request being for communications to the external network;

route outgoing network traffic originating from the user device to the external network when the communication request is designated as originating from one of the plurality of authorized devices according to the route map; and when the communication request is designated as originating from other than one of the plurality of authorized devices according to the route map:

forward one or more packets forming the communication request to the off-site authentication system over the external network without modifying the one or more packets;

after forwarding the one or more packets forming the communication request to the off-site authentication system, receive an authentication response from the off-site authentication system, the authentication response directing the router to add the user device to the plurality of authorized devices;

update the route map to include the user device as one of the plurality of authorized user devices in response to the authentication response; and route outgoing network traffic originating from the user device to the external network after updating the route map according to the authentication response.

12. The router of claim 11, wherein the communications subsystem is further operable to forward the one or more packets forming the communication request to the off-site authentication system by acting as a transparent proxy between the user device and the off-site authentication system.

13. The router of claim 11, wherein the communications subsystem is further operable to forward the one or more packets forming the communication request to the off-site authentication system by encapsulating the one or more packets of the communication request within data of a logical tunnel between the router and the off-site authentication system.

14. The router of claim 11, wherein the communications subsystem is further operable to continue to forward packets from the user device to the off-site authentication system during a period of time between forwarding the one or more packets forming the communication request and receiving the authentication response.

15. The router of claim 11, wherein the communications subsystem is further operable to update the route map to delete the user device from the plurality of authorized user devices after an authorization has expired for the user device.

16. The router of claim 11, wherein, after forwarding the one or more packets forming the communication request to the off-site authentication system but before receiving the authentication response from the off-site authentication system, the communications subsystem is further operable to:

receive a captive authentication portal from the off-site authentication system for the user device to become authorized to communicate as requested over the external network;

communicate the captive authentication portal to the user device;

receive an authentication request from the user device according to the captive authentication portal;

forward the authentication request to the off-site authentication system.

17. The router of claim 16, wherein the communications subsystem is further operable to:

communicate the captive authentication portal to the user device in such a way as to display an authentication prompt via a user interface of the user device; and receive the authentication request from the user device in response to the authentication prompt via the user interface.

18. The router of claim 16, wherein the communications subsystem is further operable to communicate the captive authentication portal from the router to the user device with a source address corresponding to a destination address originally requested in the communication request regardless of said destination address.

19. The router of claim 16, wherein the communications subsystem is further operable to communicate the captive authentication portal from the router to the user device with a source address being different than a destination address originally requested in the communication request.

20. The router of claim 11, wherein the route map is an access control list.

\* \* \* \* \*